United States Patent
Dellantoni et al.

(10) Patent No.: US 8,729,860 B2
(45) Date of Patent: May 20, 2014

(54) ENERGY STORAGE ASSEMBLY AND METHOD FOR OPERATING SUCH AN ASSEMBLY

(75) Inventors: Nikolaus Dellantoni, Sooss (AT); Johann Harjung, Vienna (AT); Martin Meschik, Vienna (AT); Alfred Pohl, Mistelbach (AT)

(73) Assignee: E-Moove GmbH, Vienna (AT)

( * ) Notice: Subject to any disclaimer, the term of this patent is extended or adjusted under 35 U.S.C. 154(b) by 356 days.

(21) Appl. No.: 13/141,514

(22) PCT Filed: Dec. 21, 2009

(86) PCT No.: PCT/EP2009/009173
§ 371 (c)(1),
(2), (4) Date: Jul. 26, 2011

(87) PCT Pub. No.: WO2010/088944
PCT Pub. Date: Aug. 12, 2010

(65) Prior Publication Data
US 2011/0273140 A1    Nov. 10, 2011

(30) Foreign Application Priority Data
Dec. 22, 2008    (AT) ................................ A 1999/2008

(51) Int. Cl.
*H02J 7/00*    (2006.01)
(52) U.S. Cl.
USPC ......................................... 320/118; 320/134
(58) Field of Classification Search
USPC ....................................................... 320/118
See application file for complete search history.

(56) References Cited

U.S. PATENT DOCUMENTS

| 6,608,470 B1 | 8/2003 | Oglesbee et al. |
| 7,164,272 B1 | 1/2007 | Borrego Bel et al. |

(Continued)

FOREIGN PATENT DOCUMENTS

| DE | 103 54 874 A1 | 8/2004 |
| DE | 103 45 306 A1 | 4/2005 |

(Continued)

OTHER PUBLICATIONS

International Search Report of PCT/EP2009/009173, Dated Aug. 10, 2010.

*Primary Examiner* — Arun Williams
(74) *Attorney, Agent, or Firm* — Laurence A. Greenberg; Werner H. Stemer; Ralph E. Locher

(57) ABSTRACT

The invention relates to an energy storage assembly, comprising a plurality of cells connected in series, wherein the series connection of cells is connected to a power output of the energy storage assembly and a control unit, wherein at least a part of the cells connected in series is connected to the power output and the control unit by way of potential-free controlled converter and control units connected in parallel, such that during the charging, discharging and recharging processes each of the cells is operated according to the individual performance characteristics of said cell by means of selective current drains by the converter and control units and a total current flowing at the power output of the energy storage assembly is formed by a base current flowing through the series connection of the cells and by additional currents, which are drained from the individual cells depending on the capacity of the cells. The invention allows for the interconnection of different cell types to form an energy storage assembly and for uniform charging or discharging thereof, thus facilitating optimal use of the energy stored and extending the total usage period.

7 Claims, 2 Drawing Sheets

(56) References Cited

U.S. PATENT DOCUMENTS

| | | |
|---|---|---|
| 7,598,706 B2 | 10/2009 | Koski et al. |
| 2003/0102844 A1* | 6/2003 | Bailey .......................... 320/114 |
| 2003/0141843 A1 | 7/2003 | Anzawa et al. |
| 2005/0077879 A1 | 4/2005 | Near |
| 2005/0140335 A1 | 6/2005 | Lee et al. |
| 2006/0255769 A1* | 11/2006 | Liu et al. ....................... 320/134 |
| 2010/0188093 A1* | 7/2010 | Minoda et al. ................ 324/427 |

FOREIGN PATENT DOCUMENTS

| | | |
|---|---|---|
| DE | 10 2006 022 394 A1 | 11/2007 |
| DE | 10 2008 005 208 A1 | 7/2008 |
| EP | 1 332 924 A1 | 8/2003 |
| JP | 2007336668 A | 12/2007 |

* cited by examiner

ENERGY STORAGE ASSEMBLY AND METHOD FOR OPERATING SUCH AN ASSEMBLY

BACKGROUND OF THE INVENTION

Field of the Invention

The invention relates to an energy storage assembly comprising a plurality of cells connected in series, wherein the series connection of the cells is connected to a power output of the energy storage assembly, and comprising a control unit, and relates to a method for operating such an assembly.

High-power storage batteries, as are used for example as an energy store in electric vehicles, usually comprise the interconnection of a multiplicity of galvanic cells to meet the requirements for the energy store with regard to supply voltage, power output and capacity.

Various electrochemical processes that are named on the basis of the materials used are available as the fundamental technology for the galvanic cells. These include, in particular, the lithium-ion, lithium-polymer, nickel-metal hydride or lithium-iron-phosphate techniques.

All the available techniques share the common feature that cells which are in fact identical and have been operating for the same amount of time have slightly different properties, for example on account of production tolerances and/or thermal or mechanical influences.

As a result, they have different charging and discharging characteristics, which has the effect that individual cells are loaded to a greater degree, and consequently are destroyed prematurely, which in turn causes the entire storage battery to fail.

DE10345306A1 discloses a device for charging and monitoring a vehicle battery with individual cell tapping, in the case of which some of the individual cells can be charged with a higher voltage and the individual cells are individually monitored during the discharging operation.

DE 10 2008 005 208 A1 discloses a compensating arrangement, which comprises switches arranged between the cells with which the cells can be combined in a normal configuration or a compensating configuration. In the compensating configuration, a controlled balance of the charge between the cells takes place before a charging operation.

DE 10 2006 022 394 describes a device for balancing the charge of an energy source with a plurality of cells, in which the deviation of an individual cell voltage from a variable reference value, in particular a mean voltage value of all the cells, is monitored and, if required, a discharging operation is initiated.

BRIEF SUMMARY OF THE INVENTION

The present invention is based on the object of providing an energy storage assembly of the type mentioned at the beginning that has improved properties.

This takes place according to the invention by an energy storage assembly according to the preamble of claim 1, in which at least some of the cells connected in series are connected to the power output and the control unit by way of potential-free controlled converter and control units respectively connected in parallel, such that, during the charging, discharging and charge-reversing operations, each of the cells is operated according to the individual performance characteristics of this cell by means of selective current drains by the converter and control units and a total current flowing at the power output of the energy storage assembly is formed by a base current flowing through the series connection of the cells and by additional currents, which are drained from the individual cells depending on their capacity.

The energy storage assembly according to the invention makes it possible for cells with different electrical properties to be used, obviating the need for a complex selection procedure during the production process. In addition, the exchange of defective cells is also made possible. This is not very expedient in the case of conventional storage batteries, since the newly added cells generally have different electrical properties than the cells already present. This exchange may, if required, also be performed during operation, without the energy storage assembly being disconnected from the load.

It is advantageous if the potential-free converter and control units comprise switching converters.

A major advantage of the present invention is that the cells may, at least partly, be based on different fundamental technologies. The fundamental technologies have different advantages and disadvantages. By combining cells of different types, energy storage assemblies with optimized properties can be obtained.

The solution according to the invention also produces major advantages for so-called second-life concepts, where, for example, lithium-ion storage batteries after their use in vehicles has come to an end are used for other purposes, such as for example as energy stores for photovoltaic installations.

According to an advantageous refinement of the invention, a converter and control unit is respectively assigned to a group of identical cells.

For certain applications it will be expedient not to assign a converter and control unit to each individual cell but only respectively to a group of identical cells.

It is also of advantage for the energy storage assembly to be of a modular construction, in such a way that each potential-free controlled converter and control unit forms with the respectively associated cell or group of cells a structural unit, a cell module, which is electrically and mechanically connected to the energy storage assembly by way of releasable connecting elements. The connecting elements of the cell modules are favorably releasable connections, expediently designed as plug-in connectors.

This construction according to the invention makes it possible for cell modules to be flexibly combined into energy storage assemblies, depending on the required electrical performance data of the respective operating area. In addition, it is easily possible in an initialization phase for the individual properties of the cells to be determined and also for the cell modules to be exchanged as desired. For this purpose, it is also conceivable to install the energy storage assembly in standardized racks, such as for example the so-called "19 inch racks", wherein the rear side of the rack, the so-called backplane, has a plurality of slots for slide-in modules, in the present case that is for the control unit and the cell modules. The backplane carries the plug-in connectors for the slide-in modules and connects them electrically.

The comprehensive information on the cell properties can be used for an analysis of the specific properties of the cell and their changes.

This allows, for example, the early detection of possible cell defects, as can be detected in particular in the case of lithium batteries, and the signaling thereof to external devices by way of the connecting elements BMS-V, and also the control unit BMS-C.

In particular, the thermal runaway that is feared in the case of lithium-ion storage batteries can also be detected and prevented.

In addition, on the basis of the parameters determined, it is possible to make precise statements about the remaining capacity of the energy storage assembly and, if used in an electric vehicle, to give accurate indications as to the remaining range.

The object on which the present application is based is also achieved by a method for operating an energy storage assembly as claimed in one of claims 1 to 6, in which
in an initialization phase, the individual properties of the cells are determined and in which
during the charging, discharging and charge-reversing operations, the current state of the cells is continuously checked and in which
on the basis of the capacity of the electrically weakest cell, a base current for the series connection of the cells is determined and in which
by corresponding activation of the converter and control units, the difference between the base current and the total current flowing at the power output of the energy storage assembly is provided by individual loading of individual cells depending on their capacity.

The invention is explained in more detail on the basis of an exemplary embodiment that is represented in the figures, in which by way of example:

DESCRIPTION OF THE INVENTION

Figure 1:
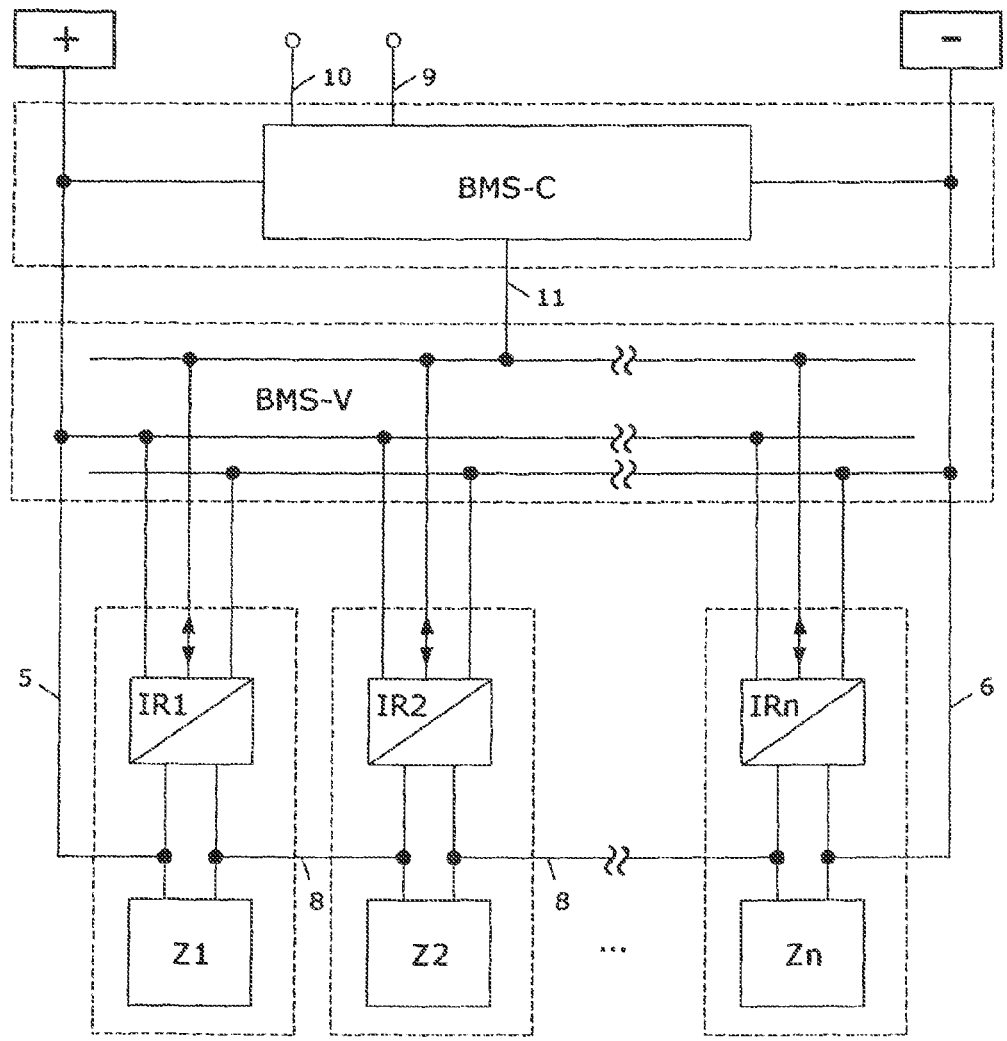
FIG. 1 shows a block diagram of the overall assembly and FIG. 2 shows a depiction of the converter and control unit.

The energy storage assembly according to the invention as shown in FIG. 1 comprises, along with a multiplicity of galvanic cells Z1, Z2, . . . Zn, a control unit BMS-C, a connecting unit BMS-V, and also, for each of the galvanic cells Z1, Z2, . . . Zn, a respectively assigned converter and control unit IR1, IR2, . . . IRn. The galvanic cells Z1, Z2, . . . Zn are connected in series by way of connecting lines 8, in order to obtain the desired voltage for the energy storage assembly, which lies at the output 5, 6 of the energy storage assembly for supplying a load.

The control unit BMS-C is connected to the converter and control units IR1, IR2, . . . IRn by way of a data connection 11. A data exchange of the control unit BMS-C with further systems, such as for example a vehicle control system, or a charger, is additionally possible by way of a system bus 9.

With an—optional—diagnostic interface 10, the configuration and the monitoring of the control unit BMS-C or the energy storage assembly can be performed.

The connecting unit BMS-V can be used on the one hand for connecting the outputs of the converter and control units IR1, IR2, . . . IRn to one another and to the positive terminal 5 and negative terminal 6 of the energy storage assembly, and on the other hand for connecting the data lines of the converter and control units IR1, IR2, . . . IRn to the data connection 11 of the control unit BMS-C.

Dispensing with switches in the connecting unit BMS-V makes it possible to avoid elements that are susceptible to faults and, in the case of circuit-breakers, expensive. Although semiconductor switches are maintenance-free, in the case of large currents they are generally expensive.

If the energy storage assembly is installed in standardized racks, such as for example the so-called "19 inch racks", the connecting unit BMS-V is formed by the rear side of the rack, the so-called backplane, which has a plurality of slots for slide-in modules, in the present case that is for the control unit and the cell modules. The backplane carries the plug-in connectors for the slide-in modules and connects them electrically.

The function of the energy storage assembly according to the invention is as follows:

In the typical state in which it is delivered, a brand-new energy storage assembly is partially charged.

Each of the converter and control units IR1, IR2, . . . IRn has from the initialization process information on essential parameters of the assigned cell or group of cells, such as for example the cell types, the maximum end-of-charge voltage, the minimum discharge voltage, the rated load (capacity), impedance, etc.

In an advantageous way, the converter and control units IR1, IR2, . . . IRn are produced with the respectively assigned galvanic cells Z1, Z2, . . . Zn or groups of cells as a structural unit, i.e. as cell modules which are electrically and mechanically connected to the storage battery unit by way of connectors.

In this case, the initial detection of the cell parameters by the converter and control units IR1, IR2, . . . IRn is already performed before the assembly operation to form an energy storage assembly. Therefore, after the assembly operation, these parameters can be immediately passed on to the control unit BMS-C. A precondition for this is a nonvolatile data memory in the converter and control units IR1, IR2, . . . IRn.

On the basis of this information, and the continuously monitored charging state of each of the galvanic cells Z1, Z2, . . . Zn and of the total current flowing at the power output, the control unit BMS-C determines optimum values for the base current flowing through the series connection of the cells and also for the additional currents to be drained from the individual cells Z1, Z2, . . . Zn depending on their capacity.

As a consequence, the discharging operation for each cell is individually controlled by the converter and control units IR1, IR2, . . . IRn in order to achieve the determined values for the base current and the additional currents.

The fact that the base current is comparatively great in relation to the additional currents means that large, and consequently expensive, converter units can be avoided.

In the case of a total current of the energy storage assembly of, for example, 50 amperes, the series connection of the cells Z1, Z2, . . . Zn is loaded with a base current of, for example, 48 amperes. The remaining 2 amperes of additional current are supplied by the converter and control units IR1, IR2, . . . IRn through individual loading of the cells with greater capacity.

The current flow through the respectively weakest cell, for example the first cell Z1, is therefore 48 amperes, while the stronger cell, for example the second cell Z2, is loaded by the assigned second converter and control unit IR2 with a current of 52 amperes, i.e. the base current of 48 amperes and an additional current of 4 amperes. This additional current of 4 amperes is converted by the second converter and control unit IR2 to the voltage level of the output voltage of the energy storage assembly, its contribution to the total current is therefore reduced by the ratio of the output voltage to the cell voltage and by comparatively small losses in the converter. By analogy with this, further cells Z3, . . . Zn make their contribution to the total current according to their capacity by way of the converter and control units IR3, . . . IRn respectively assigned to them.

The controlling of the additional current drains takes place dynamically, i.e. depending on the variation in the parameters of the individual cells. The ratio of the base current to the additional currents will therefore change depending on the variation in the discharge of the individual cells. In the case of a complete failure of a cell, this can even lead to the amount of base current tending toward zero and being replaced completely by the sum of the additional currents of the intact cells.

In the case of a charging operation, on the other hand, it is established by the control unit BMS-C when the voltage of one of the cells Z1, Z2, ... Zn approaches the cell-individual end-of-charge voltage. In this case, the respectively assigned converter and control unit IR1, IR2, ... IRn is made to return the then superfluous energy from this cell into the overall system. In this case, an additional current flow from the respective cell, for example the nth cell Zn by way of the assigned nth converter and control unit IRn into the series connection of the further cells Z1, Z2, ... Zn−1 is therefore enforced, so that the overall power consumption of the energy storage assembly, that is to say the total current consumed in this case, is reduced by this additional current, also allowing the charging operation to be made more efficient. As the charging operation continues, more and more cells Z1, Z2, ... Zn will reach their individual end-of-charge voltages and feed the superfluous charge into the overall system as an additional current flow by way of the assigned converter and control units IR1, IR2, ... IRn, so that the power consumption of the overall system in this case becomes significantly less.

In the state of rest of the energy storage assembly, i.e. when there is neither an active charging operation nor an active discharging operation, there is, depending on the type of cell, a so-called self-discharge. This is likewise different from cell to cell and, if it is drained completely, can lead to destruction of the cell Z1, Z2, ... Zn.

According to the invention, therefore, a charge-reversing operation is carried out in the state of rest of the energy storage assembly.

This takes place by enforcing a current flow from the cells with greater capacity by way of the assigned converter and control units IR1, IR2, ... IRn into the series connection of the cells, so the overall assembly is charged, and consequently premature discharge and destruction of the weaker cells is prevented.

Figure 2:
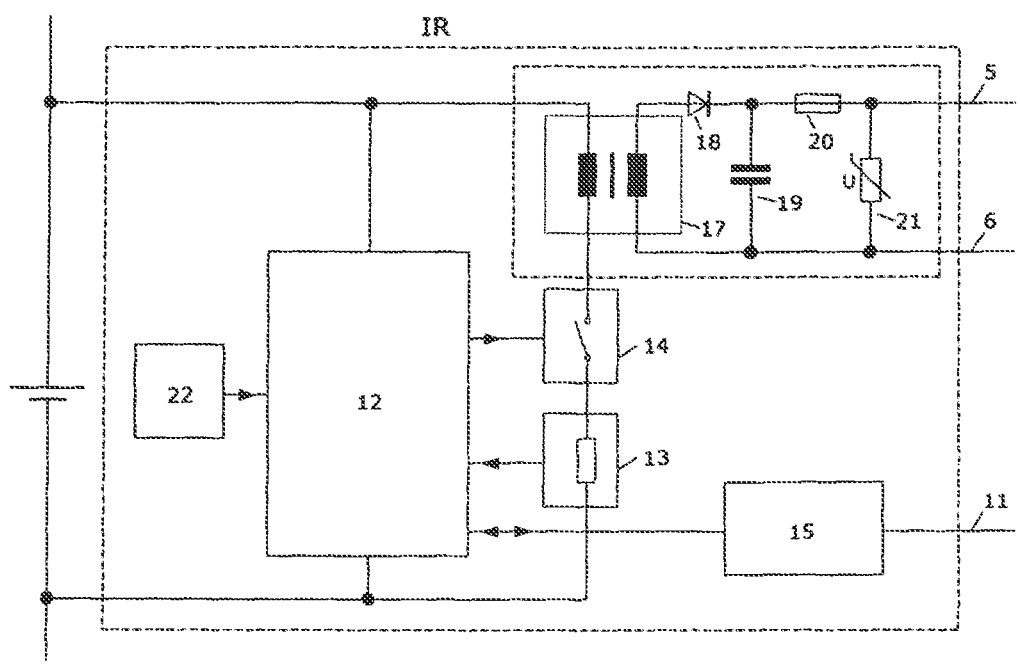

The construction of a converter and control unit IR1, IR2, ... IRn according to the invention, which is connected on the input side to the respectively assigned cell and on the output side to the power output of the energy storage assembly, is described on the basis of FIG. 2.

Each converter and control unit IR1, IR2, ... IRn comprises a control element 12, an electrical isolating stage comprising a transformer 17, a rectifier 18, a filter capacitor 19, a fuse 20, which may be configured as a reversible fuse, and an overvoltage limiting unit 21.

Also provided are a switching element 14 for converting the DC cell voltage into an AC voltage, a current sensor 13, a sensor unit 22 for temperature and other essential storage-battery parameters and a communication unit 15 for connecting the control unit to the data interface 11 with respect to the control unit BMS-C.

The switching element 14 together with the transformer 17, rectifier 18, filter capacitor 19 and fuse 20 forms a switching converter, with which the DC voltage of the cell is converted into an AC voltage, transformed to the level of the output voltage of the energy storage assembly and then rectified.

The amount of the current drain from the cell is determined by pulse width modulation of the switching element 14. The control of the switching element 14 depending on the corresponding preselections given by the control unit BMS-C is performed by the control element 12. The additional current drained from the cell is measured by means of current sensor 13.

For the dimensioning of the converter and control unit IR1, IR2, ... IRn, the following consideration is decisive:

It must be possible to transfer the power that has to be balanced in an extreme case by an individual cell. Therefore, if the energy storage assembly has, for example, 20 cells Z1, Z2, ... Zn and the intention is to be able to compensate for the complete failure of a cell, the converter must therefore be able to transfer approximately 5% of the rated power of the individual cell, since of course the other, operational 19 cells make their contribution. If there are n cells, this factor is $1/(n-1)$.

To compensate for the complete failure of a number of cells, it is necessary for the converter units to be designed with correspondingly greater capacity.

The information on the state of the respective cell is obtained by means of the sensors 22 for measurements of the cell parameters temperature, voltage and current, which are activated by means of control unit 12. The control unit 12 stores the corresponding values and passes them on to the control unit BMS-C.

For this purpose, it uses a communication unit 15, which in the simplest case may be configured as an interface adapter with electrical isolation and serves for balancing the signal voltages between the control unit 12 and the control unit BMS-C.

The assembly according to the invention produces its particular advantages whenever cells Z1, Z2, ... Zn of different technologies are used. For instance, it is suitable for combining cells for lower long-term loading with cells for higher short-term loading. The assembly is similarly favorable in the case of discharging for combining primary cells and energy converters, such as for example fuel cells, which have different performance characteristics as a result of individual parameters such as gas supply, surface properties of the electrodes, etc.

By comparing the current cell parameters, such as for example temperature, voltage and current, with stored older measured values and evaluating the changes, an analysis of the specific properties of the cell and their changes is possible.

This allows, for example, the early detection of possible cell defects, as can be detected in particular in the case of lithium batteries, and the signaling thereof to external devices by way of the connecting elements BMS-V, and also the control unit BMS-C.

In particular, the thermal runaway that is feared in the case of lithium-ion storage batteries can also be detected and prevented. This is attributed as the cause of the fires affecting laptop batteries that have recently occurred with greater frequency.

It may be advantageous to construct the converter and control units IR1, IR2, ... IRn from components that are spatially separate, so that merely a memory for the cell data forms a structural unit with the cell, while the other components of the converter and control units IR1, IR2, ... IRn are attached to the rear wall of the energy storage assembly, the so-called backplane.

As already stated, the solution according to the invention makes it possible for an energy storage assembly to operate even when there is a failure of individual cells. This property can also be used to make undisturbed operation of an energy storage assembly possible during the exchange of individual cells, by the amount of the base current being brought toward zero during the exchange of a cell, and replaced completely by the sum of the additional currents of the other cells.

The precise knowledge of the cell properties can also be used for a very exact determination of the remaining capacity of the energy storage assembly. In conjunction with a vehicle, this allows the distance that can still be covered to be determined very accurately.

The invention claimed is:

1. An energy storage assembly comprising:
a plurality of cells connected in series, wherein the series connection of the cells is connected to a power output of the energy storage assembly;
a control unit, wherein at least some of the cells connected in series are connected to the power output and the control unit by way of potential-free controlled converter and control units respectively connected in parallel, such that, during the charging, discharging and charge-reversing operations, each of the cells is operated according to the individual performance characteristics of this cell by means of selective current drains by the converter and control units and a total current flowing at the power output of the energy storage assembly is formed by a base current flowing through the series connection of the cells and by additional currents, which are drained from the individual cells depending on their capacity; and
in the case of a charging operation, the control unit is configured to establish when the voltage of one of the cells approaches a cell-individual end-of-charge voltage and, in this case, the respectively assigned converter and control unit are configured to return the then superfluous energy from this cell into the overall system.

2. The energy storage assembly as claimed in claim 1, characterized in that the potential-free controlled converter and control units comprise switching converters.

3. The energy storage assembly as claimed in claim 1, characterized in that the cells are, at least partly, based on different fundamental technologies.

4. The energy storage assembly as claimed in claim 1, characterized in that a converter and control unit is respectively assigned to a group of identical cells.

5. The energy storage assembly as claimed in claim 1, characterized in that each potential-free controlled converter and control unit forms with the respectively associated cell or group of cells a structural unit, which is electrically and mechanically connected to the energy storage assembly by way of releasable connecting elements.

6. The energy storage assembly as claimed in claim 5, characterized in that plug-in connectors are provided as releasable connecting elements.

7. A method for operating an energy storage assembly including a plurality of cells connected in series, wherein the series connection of the cells is connected to a power output of the energy storage assembly, and further including a control unit, wherein at least some of the cells connected in series are connected to the power output and the control unit by way of potential-free controlled converter and control units respectively connected in parallel, such that, during the charging, discharging and charge-reversing operations, each of the cells is operated according to the individual performance characteristics of this cell by means of selective current drains by the converter and control units and a total current flowing at the power output of the energy storage assembly is formed by a base current flowing through the series connection of the cells and by additional currents, which are drained from the individual cells depending on their capacity, and, in the case of a charging operation, the control unit is configured to establish when the voltage of one of the cells approaches a cell-individual end-of-charge voltage and, in this case, the respectively assigned converter and control unit are configured to return the then superfluous energy from this cell into the overall system, the method comprising the steps of:
in an initialization phase, determining the individual properties of the cells;
during the charging, discharging and charge-reversing operations, continuously checking the current state of the cells;
on the basis of the capacity of the electrically weakest cell, determining a base current for the series connection of the cells;
by corresponding activation of the converter and control units, providing the difference between the base current and the total current flowing at the power output of the energy storage assembly by individual loading of individual cells depending on their capacity and on the power requirement;
in the case of a charging operation, establishing with the control unit when the voltage of one of the cells approaches the cell-individual end-of-charge voltage and
when the control unit establishes that the voltage of one of the cells approaches the cell-individual end-of-charge voltage, returning, with the respectively assigned converter and control unit, the then superfluous energy from this cell into the overall system.

* * * * *